United States Patent
Osseiran et al.

(10) Patent No.: US 8,081,721 B2
(45) Date of Patent: Dec. 20, 2011

(54) METHOD AND ARRANGEMENT IN WIRELESS COMMUNICATION NETWORKS USING RELAYING

(75) Inventors: Afif Osseiran, Stockholm (SE); Andrew Logothetis, Buckinghamshire (GB)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1199 days.

(21) Appl. No.: 11/730,003

(22) Filed: Mar. 29, 2007

(65) Prior Publication Data

US 2007/0230605 A1 Oct. 4, 2007

Related U.S. Application Data

(60) Provisional application No. 60/786,710, filed on Mar. 29, 2006.

(51) Int. Cl.
*H04B 7/10* (2006.01)
(52) U.S. Cl. ........................................ 375/347
(58) Field of Classification Search ............ 375/347, 375/346, 348, 349, 296
See application file for complete search history.

(56) References Cited

U.S. PATENT DOCUMENTS

| | | | |
|---|---|---|---|
| 2010/0080114 A1* | 4/2010 | Ratnam et al. | 370/210 |
| 2010/0265904 A1* | 10/2010 | Yang et al. | 370/329 |

FOREIGN PATENT DOCUMENTS

WO   WO 2006/121381   11/2006

OTHER PUBLICATIONS

T. Riihonen, R. Wichman, and T. Roman, "Rate Optimization for 2D OFDM Relaying", IEEE Communications Letters, 11(7):586-588, Jul. 2007.*

Doppler K., Osseiran A., Wodczak M., Rost P. "On the Integration of Cooperative Relaying into the WINNER System Concept", IST Mobile and Wireless Communications Summit, Jul. 2007.*

International Search Report of the International Searching Authority dated Jul. 5, 2007 in corresponding Application No. PCT/EP2007/053037.

Abstract: Kainan Zhouet al., Performance of 2D FFT modulated signal over multipath fading channels, Personal, Indoor and Mobile Radio Communications, 2004, PIMRC 2004, 15th IEEE International Symposium on Barcelona, Spain Sep. 5-8, 2004, Piscataway, NJ, USA, IEEE, vol. 2, Sep. 5, 2004, pp. 1337-1341, XP010754044.

Abstract: Osseiran A., "Advanced Antennas in Wireless Communications," Apr. 2006, Royal Institute of technology, Stockholm, Sweden, XP002438721, URL:http://www.cos.ict.kth.se/publications/publications/2006/TRITA-ICT-COS-0602.PDF, pp. 181-190.

European Office Action dated Jun. 4, 2009, in related EP application 07 727 509.7.

Translation of Chinese official action, Dec. 15, 2010, in corresponding Chinese Application No. 200780012422.9.

(Continued)

*Primary Examiner* — Jaison Joseph (74) *Attorney, Agent, or Firm* — Nixon & Vanderhye P.C.

(57) ABSTRACT

A wireless communication system uses relaying to enhance performance. Artificial frequency selectivity and spatial diversity are provided by introducing delay diversity. A transformed OFDM chunk is subjected to a 2D cyclic prefix by pre-appending to a representation of the chunk the last column of the representation and by copying a number of the last rows of the pre-appended chunk to the top of the representation thereby forming an augmented OFDM chunk.

25 Claims, 5 Drawing Sheets

OTHER PUBLICATIONS

Office Action mailed Jun. 15, 2011 in co-pending U.S. Appl. No. 12/947,452.

Anghel et al., Distributed Space-Time Coding in Cooperative Networks, NORSIG-2002, 5$^{th}$ Nordic Signal Processing Symposium, Oct. 4-7, 2002, on board Hurtigruten Norway, 6 pages.

Larsson, Large-Scale Cooperative Relaying Network with Optimal Coherent Combining under Aggregate Relay Power Constraints, 5 pages.

Laneman et al., An Efficient Protocol for Realizing Distributed Spatial Diversity in Wireless Ad-hoc Networks, Research Laboratory of Electronics, Massachusetts Institute of Technology, in Proc. ARL FEDLAB Symp. On Adv. Telecom. & Inform. Distrib. Prog. (ATIRP), College Park, MD, Mar. 2001., 5 pages.

Laneman et al., Cooperative Diversity in Wireless Networks: Algorithms and Architectures, Massachusetts Institute of Technology, Sep. 2002, pp. 1-187.

\* cited by examiner

METHOD AND ARRANGEMENT IN WIRELESS COMMUNICATION NETWORKS USING RELAYING

This application is a new U.S. application claiming priority to U.S. Provisional Appln. No. 60/786,710, filed 29 Mar. 2006, the entire content of which is hereby incorporated by reference.

TECHNICAL FIELD

The described below relates to wireless communication systems wherein relaying is used to enhance performance. In particular, the technology described below relates to a method and arrangement for providing diversity in a wireless communication system utilizing Orthogonal Frequency Domain Multiplexing (OFDM) technology.

BACKGROUND

A main striving force in the development of wireless/cellular communication networks and systems is to provide, apart from many other aspects, increased coverage or support of higher data rate, or a combination of both. At the same time, the cost aspect of building and maintaining the system is of great importance and is expected to become even more so in the future. As data rates and/or communication distances are increased, the problem of increased battery consumption is another area of concern.

Until recently the main topology of wireless communication systems has been fairly unchanged, including the three existing generations of cellular networks. The topology of existing wireless communication systems is characterized by the cellular architecture with the fixed radio base stations and the mobile stations as the only transmitting and receiving entities in the networks typically involved in a communication session.

Several new transmission, or radio access, technologies have been proposed to increase capacity, flexibility and/or coverage in the communication systems. A promising technology is Orthogonal Frequency Domain Multiplexing (OFDM) that transmits multiple signals simultaneously over a wired or wireless communication medium. In wireless communications, the OFDM receiver is relative simple, since the multiple data streams are transmitted over a number of parallel flat fading channels. In fact, equalization is not done in the time domain; instead, one-tap filters in the frequency domain are sufficient. Despite this simplicity, uncoded OFDM transmission lacks inherent diversity that greatly helps to combat loss in the radio propagation environment, i.e. path loss, fast fading, etc.

One way to introduce diversity in the received signal is to utilize multiple antennas at the transmitter and possibly also at the receiver. The use of multiple antennas offers significant diversity and multiplexing gains relative to single antenna systems. A system utilizing multiple antennas both at the transmitter and at the receiver is often referred to as Multiple-Input Multiple-Output (MIMO) wireless systems. The spatial diversity offered by such systems can thus improve the link reliability and the spectral efficiency relative to Single-Input Single-Output (SISO) system.

An alternative approach to introduce macro-diversity is cooperative relaying. Cooperative relaying systems have many features and advantages in common with the more well-known multihop networks, wherein typically, in a wireless scenario, a communication involves a plurality of transmitting and receiving entities in a relaying configuration. Such systems offer possibilities of significantly reduced path loss between communicating (relay) entities, which may benefit the end-to-end (ETE) users. The cooperative relaying systems are typically limited to only two (or a few) hop relaying. A typical cooperative relaying system comprises of an access point, for example a radio base station which communicates with one or more user equipments, for example a mobile station, via a plurality of relay nodes.

In contrast to multihop networks, cooperative relaying systems exploits aspects of parallelism and also adopts themes from advanced antenna systems. These systems have cooperation among multiple stations or relay nodes, as a common denominator. In recent research literature, several names are in use, such as cooperative diversity, cooperative coding, and virtual antenna arrays. In the present application the terms "cooperative relaying system" and "cooperative schemes/methods" is meant to encompass all systems and networks utilizing cooperation among multiple stations and the schemes/methods used in these systems, respectively. The term "relaying system" is meant to encompass all systems and networks utilizing relying in any form, for example multihop system and cooperative relaying systems. A comprehensive overview of cooperative communication schemes are given in *Cooperative Diversity in Wireless Networks: Algorithms and Architectures*, J. N. Laneman, Ph.D. Thesis, Massachusetts Institute of Technology, Cambridge, Mass., August 2002.

Various formats of a relayed signal may be deployed. A signal may be decoded, re-modulated and forwarded, or alternatively simply amplified and forwarded. The former is known as decode-and-forward or regenerative relaying, whereas the latter is known as amplify-and-forward, or non-regenerative relaying. Both regenerative and non-regenerative relaying is well known, e.g. by traditional multihopping and repeater solutions respectively. Various aspects of the two approaches are addressed in "*An Efficient Protocol for Realizing Distributed Spatial Diversity in Wireless Ad-Hoc Networks*", J. N. Laneman and G. W. Wornell, Proc. of ARL FedLab Symposium on Advanced Telecommunications and Information Distribution (ATIRP-2001), (College Park, Md.), March 2001.

Diversity gain is particularly attractive since it offers increased robustness of communication performance as well as allowing reduction of experienced average SNR for the same BER. In addition the cooperative relaying may provide other positive effects such as beamforming (or directivity) gain, and spatial multiplexing gain. The general benefits of the mentioned gains include higher data rates, reduced outage primarily due to different forms of diversity, increased battery life, and extended coverage.

There are several schemes that offer diversity gain: Alamouti diversity based cooperative relaying for example described in "*Distributed Space-Time Coding in Cooperative Networks*", P. A. Anghel et al, Proc. of the Nordic Signal Processing Symp., Norway, October 2002. coherent combining based relaying, which in addition offer a beamforming gain as described in "*Large-Scale Cooperative Relay Network with Optimal Coherent Combining under Aggregate Relay Power Constraints*", P. Larsson, Proc. Future Telecommunications Conference (FTC2003), Beijing, China, 9-10/12 2003. pp 166-170. and relay cyclic delay diversity as described in WO06121381. According to the scheme the relay nodes, in their forwarding between the base station and the user equipment, applies cyclic shifts to their respective forwarded OFDM symbols.

These schemes require two transmission phases for each down link (DL) and up link (UL) direction: for example in the DL, in the first transmission phase the basestation transmits to the relay node, and in the second transmission phase the relay node transmits to the user equipment. The two phase transmission methods may effectively reduce the data throughput by half.

SUMMARY

Significant shortcomings of the prior art are evident from the above. Hence, it would be desirable to provide a method that introduces artificial frequency, time and spatial diversity and requires only a single transmission phase for each direction in a cooperative relaying wireless communication system.

An object of the technology described below is to provide a method, a relay node and a system that overcomes the drawbacks of the prior art techniques.

The problem is solved by performing communication in a communication system utilizing relaying and Orthogonal Frequency Domain Multiplexing (OFDM). Consider a transmitting radio node scenario, for example a radio base station is engaged in communication with at least one receiving radio node, for example a user equipment. Part of the communication between the transmitting and receiving node is direct, and part is via at least one relay node. Data is transmitted in the form of OFDM chunks comprising a plurality of OFDM symbols. A cyclic prefix is added to a representation of an OFDM during the transmission phase by:

pre-appending to the representation of the OFDM chunk the last OFDM symbol from the end of the representation of the OFDM chunk;

after the pre-appending copying a pre-determined number of last rows of the pre-appended OFDM chunk to the top of the representation of the OFDM chunk forming an augmented OFDM chunk.

The first step can be seen as providing a column-wise cyclic prefix, and the second step as providing a row-wise cyclic prefix, resulting in a 2-dimensional cyclic prefix procedure.

The number of rows selected to be copied to the top of the augmented chunk should correspond to the length of the cyclic prefix or guard interval which depends on the delay spread of the radio channels.

One example embodiment comprises the steps of:

defining a OFDM chunk B comprising N sub-carriers and spanning a time window corresponding to M OFDM symbols;

applying a 2-dimensional IFFT to the OFDM chunk B, resulting in a transformed chunk X;

pre-appending to the transformed chunk X the last OFDM symbol of the transformed chunk X;

after the pre-appending of the transformed chunk X copying the last rows of the pre-appended transformed chunk X to the top of the transformed chunk X forming an augmented OFDM chunk X'.

In the relaying performed by one or more relay nodes the re-transmission is delayed with one OFDM symbol.

A transmitter is adapted for use in a radio node in a communication system utilizing relaying and Orthogonal Frequency Domain Multiplexing. The transmitter comprises a cyclic prefix module adapted for adding a 2 dimensional cyclic prefix to a representation of the OFDMA chunks, by pre-appending to a representation of the OFDM chunk the last OFDM symbol of the representation of the OFDM chunk, and copying the last rows of the pre-appended OFDM chunk to the top of the pre-appended OFDM chunk, forming an augmented OFDM chunk.

Thanks to the technology described, it is possible to take full advantage of the combined advantages of the OFDM technique and cooperative relaying, without increasing the complexity of the transmitter and receivers in any significant way. Neither does the novel method require any extensive control signaling that could reduce the traffic capacity. In contrast to prior art techniques only one transmission phase is needed.

The 2D-CP method and arrangements can provide substantial Data Rate increase in the order of (2M−2)/M, wherein M is the number of OFDM symbols in the chunk. For example, if M=15 then the gain is approximately 93%.

A further advantage is that antenna specific pilots are not required. Instead, the same pilot pattern on the frequency/time grid are to be transmitted from all transmit antennas. The receiver, user equipment, for example, has knowledge of the pilot pattern so that channel estimates can be obtained.

A still further advantage is increased frequency and time selectivity of the overall effective channel.

Other objects, advantages and novel features will become apparent from the following detailed description when considered in conjunction with the accompanying drawings and claims.

BRIEF DESCRIPTION OF THE FIGURES

FIG. 2a-f illustrates the transmission phase for 1-hop systems (a-b), 2-hop systems (c-d) and 2-hop systems utilizing the 2D-;

DETAILED DESCRIPTION

Non-limiting, example embodiments will now be described with reference to the figures.

Figure 1A:
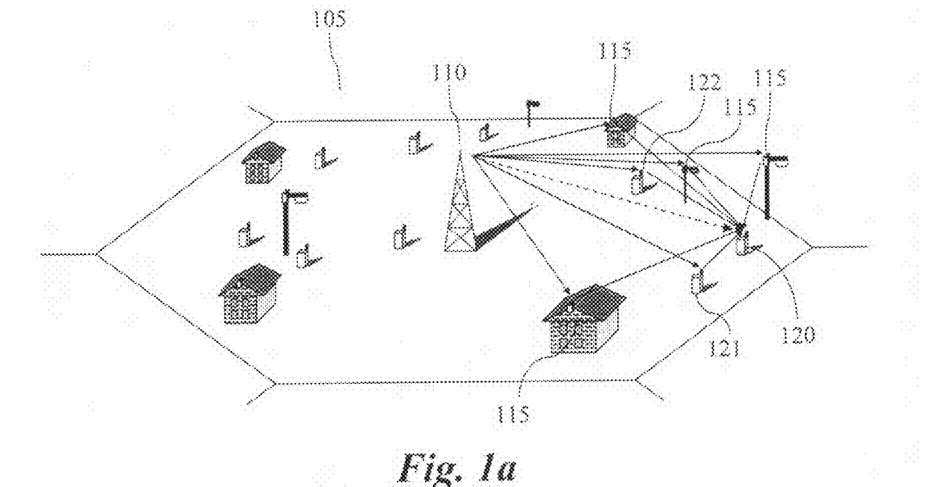
FIG. 1a and 1b illustrates schematically a cellular system using cooperative relaying wherein the method and arrangement may be advantageously implemented.

The network outlined in FIG. 1 is an example of a cooperative relaying network. The figure shows one cell 105 of the wireless network comprising a transmitting communication node, an access point (AP) 110, a plurality of relay nodes (RN) 115 and a plurality of receiving communication nodes or user equipment (UE) 120. The access point is typically a radio base station (BS) providing the point of access to and from the core network to the radio access network. User equipments, also referred to as user terminals include, but are not limited to for example, mobile stations, laptop computers and PDAs equipped with wireless communication and vehicles and machinery equipped with wireless communication. As shown in the figure, the relaying nodes 115 are mounted on masts, buildings, lamp posts etc. Fixed relay nodes may be used as line of sight conditions can be arranged, directional antennas towards the basestation may be used in order to improve SNR (Signal-to-Noise Ratio) or interference suppression and the fixed relay nodes may not be severely limited in transmit power as the electricity supply network typically may be utilized. However, mobile relays, 121 and 122, such as mobile user terminals, may also be used, either as a complement to fixed relay nodes or independently. The user terminal 120 is in active communication with the base station 110. The radio communication, as indicated with arrows, is essentially simultaneously using a plurality of paths, characterized by two hops, i.e. via at least one relay node 115. The first part, from the access point 110 to at least one relay node 115, will be referred to as the first link, and the second part, from the relay node or nodes to the user terminal 120 will be referred to as the second link. In addition direct communication between the access point 110 and the user terminal 120 is utilized, in the figure indicated with a dashed arrow. The communication system may simultaneously set up and maintain a large plurality of communication sessions between the BS 110 and user equipments 120, and in the different communication sessions using different sets of relay nodes 115. The relay nodes engaged in a specific communication may change during the session as the user terminal moves or the radio environment changes for other reasons.

Figure 1B:
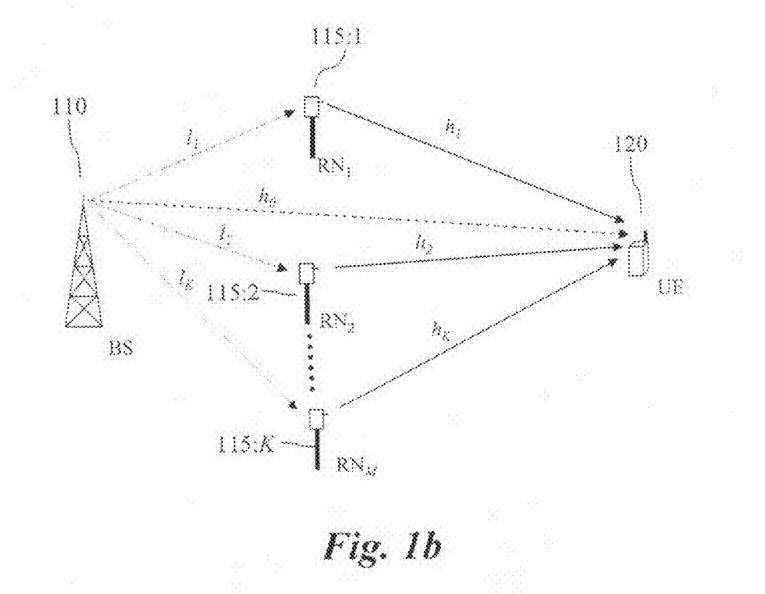

The real world cellular system outlined in FIG. 1*a* is for simplicity modeled by system model shown in FIG. 1*b*, here with focus on a single pair of transmitter and receiver, utilizing an arbitrary number K of relay nodes. The notation is adapted to a BS 110 as a transmitter and an UE 120 as a receiver, but not limited thereto. The communication between the BS 110 and the UE 120 can be described as comprising two main parts: the transmissions from the BS 110 to the relay nodes 115:k, k∈{1, 2, . . . , K}, referred to as the first link, and the transmissions from the relay nodes 115:k to the UE 120 referred to as the second link. The radio paths on the first link are characterized by the respective channel impulse response $l_k$, and the radio paths on the second link by the respective channel impulse response $h_k$.

Each of radio nodes, i.e. BS 110, RN 115 and UE 120 utilizes of one or more antennas. The BS 110 transmits to K RNs and to the UE during a predefined period. The RN forwards the information received from a first node (e.g. BS 110) to a second node (e.g. UE) with one symbol delayed. This can be done either with amplify and forward, decode and forward, or a hybrid of the two.

Figure 2A:
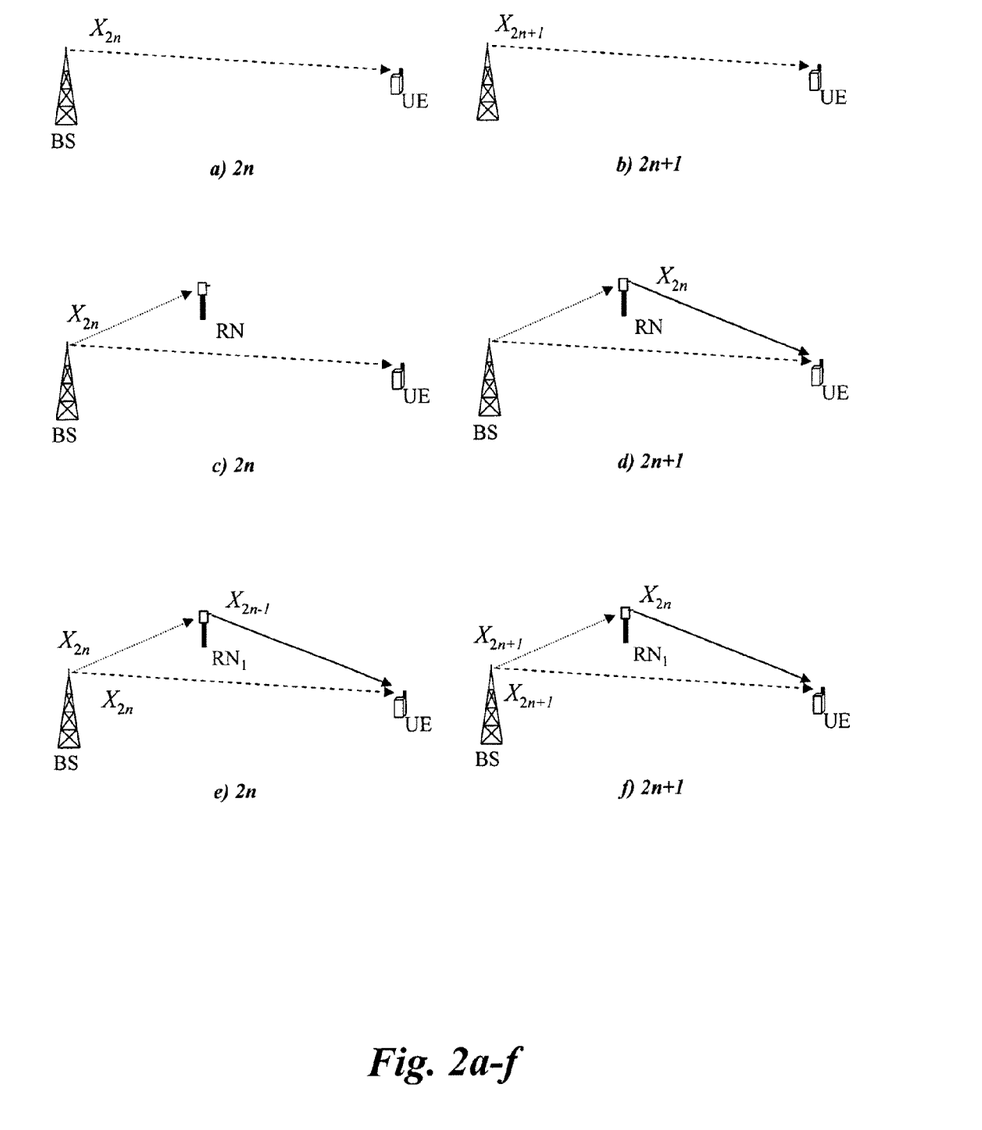

FIG. 2*a-f* illustrates the difference between the 1-hop, classical 2-hop and the 2D-CP system. As shown in FIGS. 2*a* and 2*b*, in a 1-hop system the data signal is transmitted to the UE in two consecutive time slots (i.e. 2*n* and 2*n*+1). For instance, the symbol $x_{2n}$ is transmitted at the time slot 2*n* and is followed by $x_{2n+1}$ at the next slot. By contrast in a 2-hop system, in order to avoid the BS 110 and RN interfering with each other the transmission is done in two phases (i.e. hops). During the first hop, 2*n* slot in FIG. 2*c*, the BS 110 transmits the data signal $x_{2n}$ to the RN. The UE may also receive $x_{2n}$. During the second hop (2*n*+1) the RN retransmits the same data signal $x_{2n}$ to the UE as shown in FIG. 2*d*.

The transmission scheme is illustrated in FIGS. 2*e-f*. Signals are transmitted in the form of OFDM chunks comprising a plurality of OFDM symbols. A cyclic prefix is added to a representation of the OFDM chunks by pre-appending to the representation of the OFDM chunk the last OFDM symbol of the representation of the OFDM chunk, forming an augmented OFDM chunk. The procedure will be described in detail below. In contrast to the classical 2-hop system, the transmission can now be in full duplex. In fact, the BS 110 will transmit during the two consecutive phases, eg. 2*n* and 2*n*+1, two different data signals $x_{2n}$ and $x_{2n+1}$, respectively. As shown in FIG. 2*e*, during time slot 2*n*, the RN will forward data $x_{2n-1}$, which was received from the BS 210 at the previous time slot, 2*n*−1. During time slot 2*n*+1, the RN will forward the signal data $x_{2n}$ (see FIG. 20.

Figure 3:
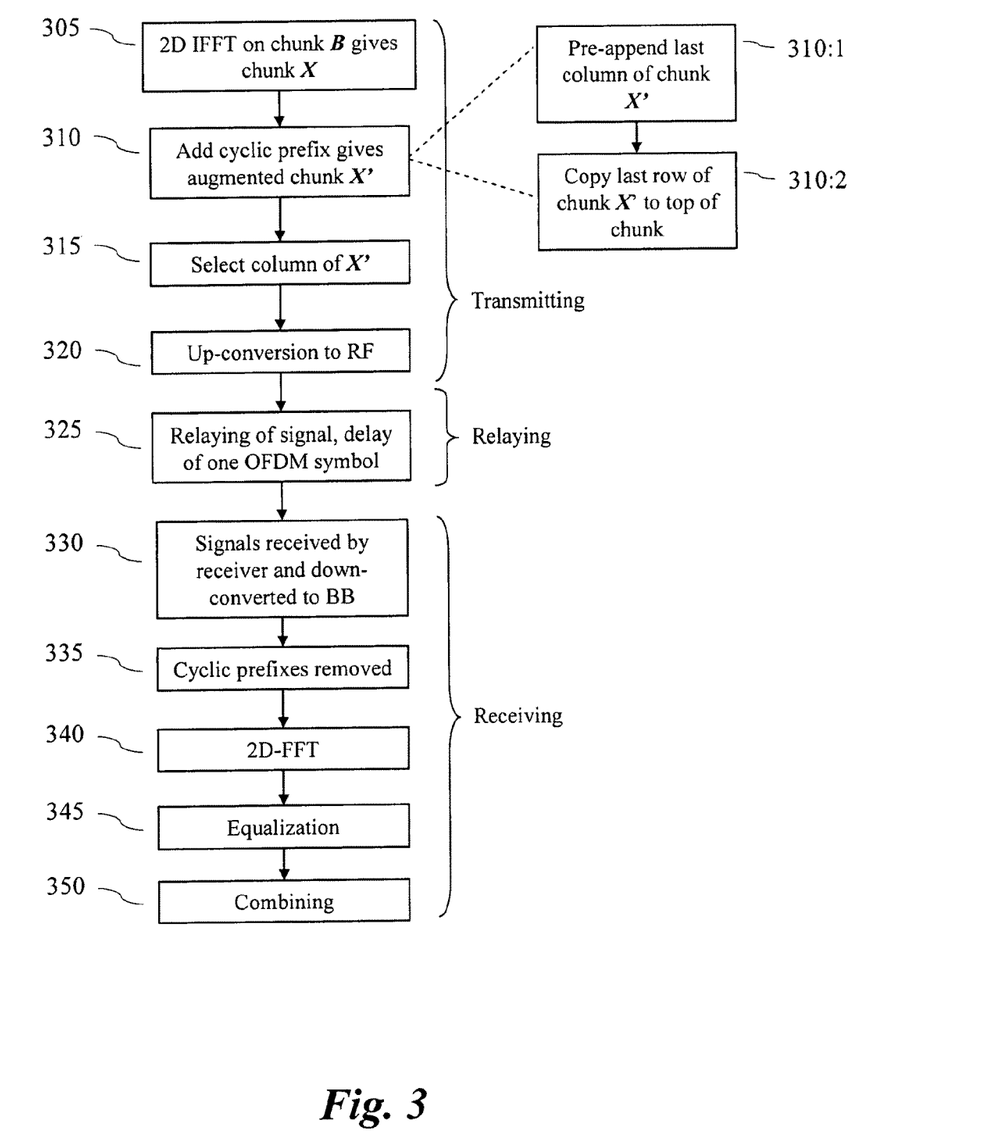
FIG. 3 is a flowchart of an example method according to the invention.
Figure 4:
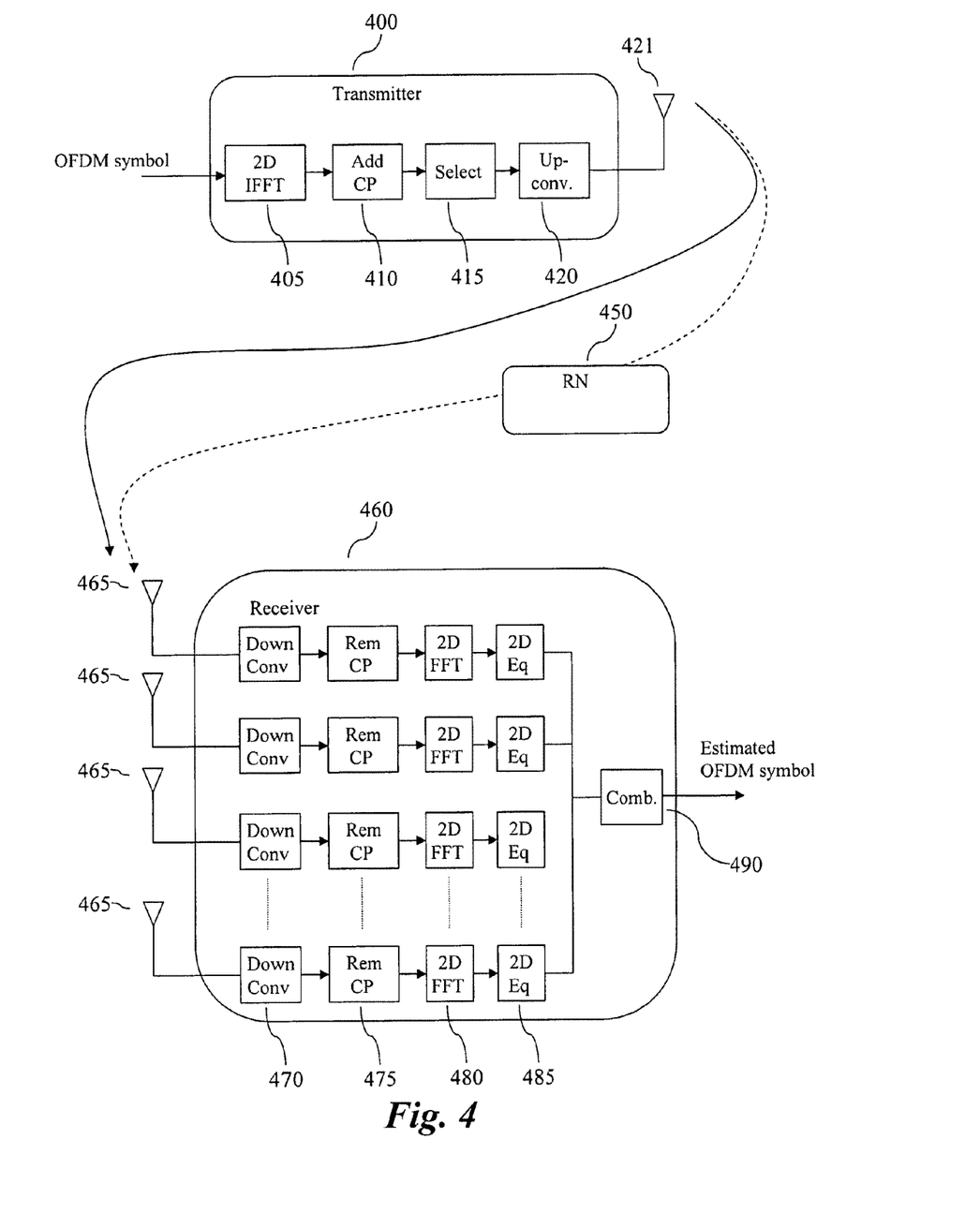
FIG. 4 is a schematic illustration of a transmitter and a receiver.

FIG. 3 is flowchart of a transmission, and FIG. 4 shows a transmitter 400 and a receiver 460 adapted to carry out the procedure. The transmission is both direct, indicated with the solid arrow, and via a relay node 450, indicated with a dashed arrow. The basic time-frequency resource unit in a OFDM system is defined as a chunk. Each chunk entity comprises of N sub-carriers and spans a time window of M OFDM symbols, and B denotes the N×M matrix of the chunk.

The method comprises the steps of:

305: A 2D-IFFT module 405 of the transmitter 400 performs an inverse 2-dimensional fast Fourier Transform (2D-IFFT of the chunk B of the coded input data stream. The output from the 2D-IFFT module 405 is denoted X and is an representation of the chunk B.

Figure 5:
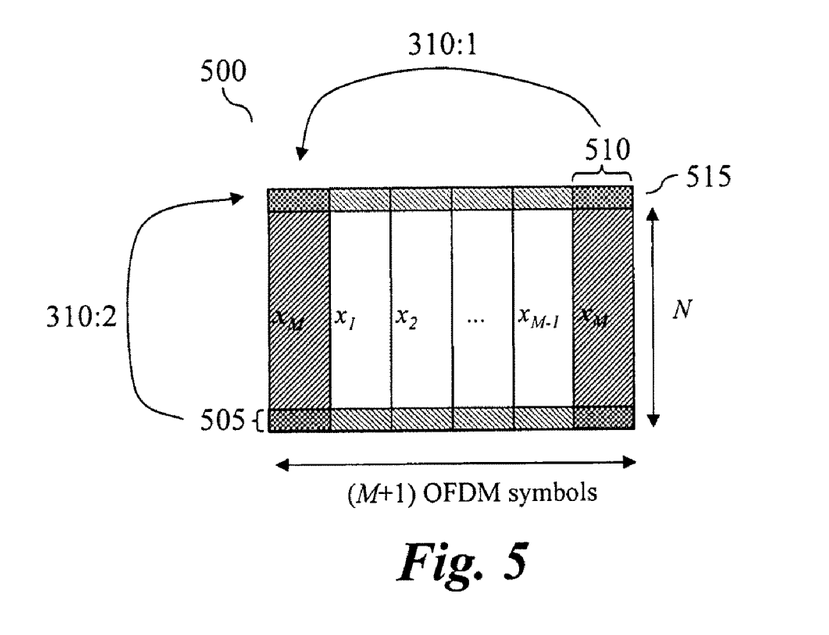
FIG. 5 is a schematic illustration of an example augmented OFDM chunk.

310: A cyclic prefix module 410, in connection with the 2D-IFFT module 405, subjects the transformed chunk X to 2D cyclic prefix. The procedure, which is further illustrated in FIG. 5, comprises the substeps of:

310:1 pre-appending to the chunk X 500 the last OFDM symbol of the chunk X, corresponding to the last column of X, 510, giving a column-wise cyclic prefix.

310:2 copying a pre-determined number of the last rows 505 of the pre-appended chunk to the top 515 of the chunk X, giving a row-wise cyclic prefix.

The row-wise cyclic prefixing eliminates the inter-OFDM symbol-interference. Similarly, the column-wise cyclic prefix, as will be described, eliminates the interference from the simultaneous transmission of the data from the BS and RN. The resulting augmented chunk, which is outputted from the cyclic prefix module 405 is denoted X'.

The second substep, 310:2, corresponds to the use of cyclic prefix in prior art OFDM transmission techniques. An appropriate size of the cyclic prefix, as well as a suitable size of the OFDM chunk depend on characteristics of the radio channels and are determined in conventional manners. The appropriate sizes are to be considered as known input parameters to the method and arrangement.

315: In a selection module 415, in connection with the cyclic prefix module 410, the augmented block X' is subjected to linear operations including selecting one column of X' during each OFDM symbol transmission. At the first instant the first column of X' is selected, the second time instant the second column of X' is selected. The procedure is repeated until all columns of X' are transmitted.

320: An up conversion and transmitting module 420, converts the baseband signals outputted from the selection module 415 into the RF-band, and transmitted from the antenna or antennas 421.

325: The transmitted signal is relayed by at least one relay node. The re-transmission is delayed with one OFDM symbol, i.e. one column of X' is re-transmitted at the same time as a consecutive column of X' is transmitted from transmitter 400.

330: The transmitted signals, both direct from the transmitter 400 and from the relay node 450 or relay nodes, are received by the receiver 460, depicted in FIG. 4. Each receive antenna 465 is connected to a respective down conversion module 470, wherein the signal is down-converted from the RF-band into the baseband.

335: In cyclic prefix removal modules 475 the cyclic prefix is removed from the signals provided from the down conversion modules 470.

340: A 2-dimensional fast Fourier transform is applied to respective signal by 2D FFT modules 480.

345: Each signal is equalised by a 2-dimensional equalisation process by equalizer modules 485, in connection with respective 2D FFT modules.

350: The signals originating from each antenna 465 is finally combined in a combining process, for example with a Maximum Ratio Combining (MRC) procedure in a combining module 490. Outputted from the combining module 490 is the chunk estimate $\hat{B}$ of B.

The relaying performed by the relay node or nodes in step 325 does not require a 2-dimensional processing as in the receiver and transmitter, one-dimensional FFTs and an IFFT, for the receiving and transmitting respectively, are sufficient. Hence, a relay node employed in a system can be (but need not be) identical to a relay node in prior art relayed OFDM systems.

Figure 6:
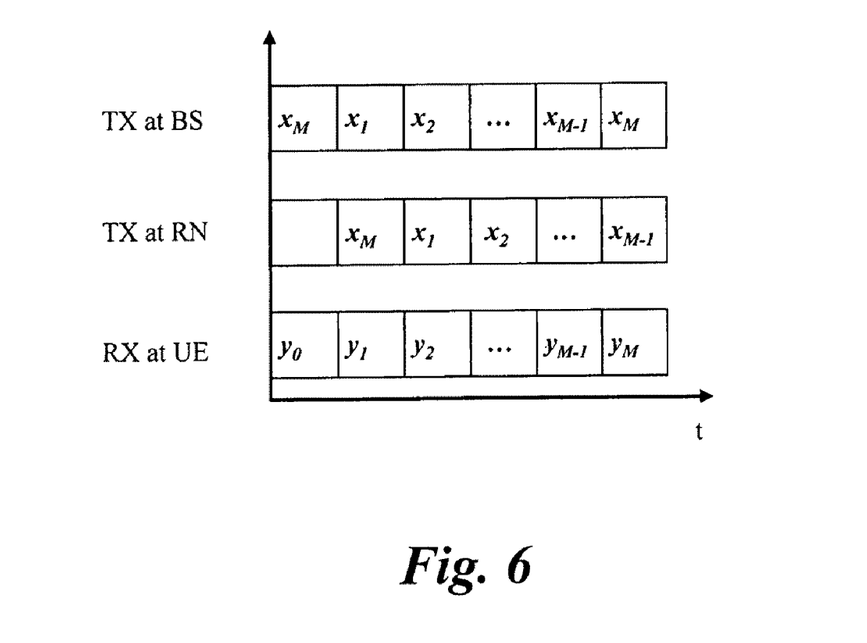
FIG. 6 is a schematic illustration of how a block of OFDM symbols are transmitted by the BS, the RN and received by the UE.

The transmission process according to the method is further illustrated in FIG. 6, wherein the augmented chunk X' at the BS (transmitter) and the RN and the received chunk $\hat{B}$ at UE (receiver) are illustrated. As shown in the figure, during the first time instant (t=0), the last symbol $x_M$ is transmitted by the BS, and a noisy version of the signal is received by the UE; the received signal is denoted by $y_0$. The RN also receives the signal $x_M$, but forwards it during the subsequent time slot. At time instant (t=1), the BS transmits the first symbol $x_1$ in the data block and the UE will receive a linear combination of $x_M$ from the RN and $x_1$ from the BS. The process is repeated until the BS transmits the entire data sequence in X'.

The arrangements in a receiver and transmitter have been described in terms of modules and blocks. The modules and blocks are to be regarded as functional parts of a transmitting and/or receiving node in a communication system, and not necessarily as physical objects by themselves. The modules and blocks are at least partly preferably implemented as software code executed by a computer, to be adapted to effectuate the method. The term "comprising" does primarily refer to a logical structure and the term "connected" should here be interpreted as links between functional parts and not necessarily physical connections. However, depending on the chosen implementation, certain modules may be realized as physically distinctive objects in a receiver or transmitter.

The mathematical definitions of the terms used in the application will be given and exemplified in the following section:

Notation:

Let ● and ⊗ denote the Hadamard and the Kronecker product, respectively. $(\cdot)^T$ denotes the transpose and $(\cap)^H$ the Hermitian transpose operator. Capital letters represent matrices, and lower case letters represent vectors or scalars.

DEFINITIONS

Definition 1: $F_M$ denotes the FFT matrix of size M×M. The (n,m)th element of $F_M$, for n, m∈{1, 2, . . . , M} is given by $$F_M(n,m) = \frac{1}{\sqrt{N}} \exp\left(-\frac{j2\pi(n-1)(m-1)}{N}\right) \quad (1)$$

Definition 2: For an M×1 vector a=[a(1), a(2), . . . , a(M)]$^T$, the right circulant matrix $$A \triangleq Circ(a),$$

is generated as follows $$A = \begin{bmatrix} a(1) & a(M) & a(M-1) & \cdots & a(2) \\ a(2) & a(1) & a(M) & \cdots & a(3) \\ a(3) & a(2) & a(1) & \cdots & a(4) \\ \vdots & \vdots & \vdots & \ddots & \vdots \\ a(M) & a(M-1) & a(M-2) & \cdots & a(1) \end{bmatrix} \quad (2)$$

The right circulant matrix A is diagonalized using the FFT matrix FM as follows $$A = \sqrt{M} F_M^H D(F_M a) F_M \quad (3)$$

where D(x) denotes a diagonal matrix with x on its main diagonal.

Definition 3: The two dimensional (2D) FFT of a matrix X of size N×M, denoted by $\tilde{X}$, is given by $$\tilde{X} = F_N X F_M \quad (4)$$

An illustrative example of the usefulness of the method and arrangements will be given with reference to FIG. 2b, wherein one BS, K RNs and one UE are in communication. The BS and the RNs are each assumed to be equipped with a single transmit antenna. Furthermore, the OFDM symbols are correctly detected by the RNs before being forwarded to the UE.

Under this assumption, the received symbol $y_m$ at the UE is a linear combination of the transmitted symbol $x_m$ from the BS and the delayed symbol $x_{m-1}$ transmitted from the RNs. $y_m$ can be expressed as:

$$y_m = H_0 x_{1+(m-1)M} + H_e x_{1+(m-2)M} \quad (5)$$

where $H_0 = Circ(h_0)$ is the channel matrix between the BS transmit antenna and the UE, $H_e$ is the combined channel matrix, or effective channel matrix, from all K RNs to the UE. $H_e$ can be expressed as:

$$H_e = \sum_{k=1}^{K} Circ(h_k) = Circ(h_e)$$

where $h_k$ for k∈{1, 2, . . . , K} denotes the channel impulse response from the k$^{th}$ RN to the UE. $h_e$ is the effective channel impulse response and its FFT can be expressed as:

$$\tilde{h}_e = \sqrt{N} \sum_{k=1}^{K} (\tilde{h}_k \cdot \tilde{e}_{\delta_k}) \quad (6)$$

Ignoring the first received symbol of the chunk at the UE, the M following received symbols from the same chunk can be written in a matrix form as follows:

$$\begin{bmatrix} y_1 \\ y_2 \\ y_3 \\ \vdots \\ y_{M-1} \\ y_M \end{bmatrix} = \begin{bmatrix} H_0 & 0 & 0 & \cdots & 0 & H_e \\ H_e & H_0 & 0 & \cdots & 0 & 0 \\ 0 & H_e & H_0 & \cdots & 0 & 0 \\ \vdots & \vdots & \vdots & \ddots & \vdots & \vdots \\ 0 & 0 & 0 & \cdots & H_0 & 0 \\ 0 & 0 & 0 & \cdots & H_e & H_0 \end{bmatrix} \times \begin{bmatrix} x_1 \\ x_2 \\ x_3 \\ \vdots \\ x_{M-1} \\ x_M \end{bmatrix}. \quad (7)$$

Define the following $$Y = [y_1, y_2, \ldots, y_M], \quad (8)$$

$$X = [x_1, x_2, \ldots, x_M], \quad (9)$$

$$H = [h_0, h_e, 0, \ldots, 0]. \quad (10)$$

Then it can be shown that the received signal after applying a 2D-FFT is given by:

$$\tilde{Y} = \sqrt{NM} \tilde{H} \cdot B, \quad (11)$$

where $\tilde{H}$ and $\tilde{Y}$ denote the 2D-FFT of the channel matrix H and the received data block Y.

The example embodiments have been envisaged in a two hop cooperative relaying scenario. The method and arrangement may advantageously be utilized also in other systems wherein a plurality of nodes are engaged in a communication session, for example a multihop system. In a typical multihop system a majority of the nodes are user equipment of various kinds, but the system may also comprise fixed nodes, such as access points. Preferably all nodes have the capability of receiving and forwarding data.

The technology has been described in connection with what is presently considered to be the most practical and preferred embodiments, it is to be understood that they are not to be limiting. On the contrary, various modifications and equivalent arrangements are included within the spirit and scope of the appended claims.

The invention claimed is:

1. A method of performing communication in a communication system using relaying and Orthogonal Frequency Domain Multiplexing (OFDM), wherein a transmitting radio node, at least one receiving radio nod; and at least one relay radio node are engaged in a communication session, and signals are transmitted in the form of OFDM chunks comprising a plurality of OFDM symbols, the method comprising a transmission phase wherein a 2-dimensional cyclic prefix is added to a representation of an OFDM chunk by:
   pre-appending to the representation of the OFDM chunk the last OFDM symbol of the representation of the OFDM chunk corresponding to the last column of the representation of the OFDM chunk;
   after the pre-appending, copying a pre-determined number of last rows of the pre-appended representation of the OFDM chunk to the top of the representation of the OFDM chunk, thereby forming an augmented OFDM chunk.

2. The method according to claim 1, further comprising:
   defining a OFDM chunk comprising N sub-carriers and spanning a time window corresponding to M OFDM symbols;
   applying a 2-dimensional IFFT to the OFDM chunk resulting in a transformed chunk;
   pre-appending to the transformed chunk the last OFDM symbol of the transformed chunk; and
   after the pre-appending of the transformed chunk, copying the last rows of the pre-appended transformed chunk to the top of the transformed chunk, thereby forming the augmented OFDM chunk.

3. The method according to claim 1, further comprising:
   selecting one column of the augmented chunk during each OFDM symbol transmission, wherein at a first instant the first column of the augmented chunk is selected and at second time instant the second column of the augmented chunk is selected; and
   up-converting the signals from the baseband into the RF-band and transmitting the signals,
   repeating the selecting, up-converting, and transmitting until all columns of the augmented chunk are transmitted.

4. The method according to claim 3, wherein the transmitted signals are relayed by the relay node, and wherein a re-transmission in the relay node is delayed by one OFDM symbol.

5. The method according to claim 4, further comprising a upon reception of the signals, forming an estimate of the chunk,
   wherein at least one received OFDM symbol is a linear combination of two subsequent OFDM symbols of the chunk.

6. The method according to claim 1, wherein the communication system uses cooperative relaying.

7. The method according to claim 1, wherein the communication system uses multihop relaying.

8. The method according to claim 1, wherein the relaying is regenerative.

9. The method according to claim 1, wherein the number of rows is determined from radio channel characteristics.

10. A transmitter adapted for use in a radio node in a communication system using relaying and Orthogonal Frequency Domain Multiplexing (OFDM), comprising:
    a cyclic prefix module adapted for adding a 2 dimensional cyclic prefix to a representation of an OFDM chunk by pre-appending to the representation of the OFDM chunk a pre-determined column from the end of the representation of the OFDM chunk, and by copying a pre-determined number of last rows of the pre-appended OFDM chunk to the top of the representation of the OFDM chunk, thereby forming an augmented OFDM chunk, and
    an up-converter and an antenna to transmit the augmented OFDM chunk.

11. The transmitter according to claim 10, further comprising a 2D-IFFT adapted for applying a 2-dimensional IFFT to an OFDM chunk, the OFDM comprising N sub-carriers and spanning a time window corresponding to M OFDM symbols, resulting in an output, and wherein the cyclic prefix module is adapted to pre-append to a transformed chunk the last OFDM symbol of the transformed chunk, and after the pre-appending, to copy the last rows of the pre-appended transformed chunk to the top of the transformed chunk in order to form an augmented OFDM chunk.

12. The transmitter according to claim 11, further comprising a selection module and an up conversion and transmitting module, the selection module adapted to select one column of an augmented chunk X' at a first instant and at a second time instant a subsequent second column of X' and to forward select columns to the up-conversion and transmission module.

13. A radio base station comprising a transmitter according to claim 10.

14. A user equipment comprising a transmitter according to claim 10.

15. A radio node for performing communication in a communication system using relaying and Orthogonal Frequency Domain Multiplexing (OFDM) where signals are transmitted in the form of OFDM chunks comprising a plurality of OFDM symbols, the radio node comprising:
    means for adding a 2-dimensional cyclic prefix to a representation of an OFDM chunk including:
    means for pre-appending to the representation of the OFDM chunk a last OFDM symbol of the representation of the OFDM chunk corresponding to a last column of the representation of the OFDM chunk, and
    means, after the pre-appending, for copying a pre-determined number of last rows of the pre-appended representation of the OFDM chunk to the top of the representation of the OFDM chunk, thereby forming an augmented OFDM chunk; and means for transmitting the augmented OFDM chunk via an antenna.

16. The radio node according to claim 15, further comprising:
   means for defining a OFDM chunk comprising N sub-carriers and spanning a time window corresponding to OFDM symbols;
   means for applying a 2-dimensional IFFT to the OFDM chunk resulting in a transformed chunk;
   means for pre-appending to the transformed chunk the last OFDM symbol of the transformed chunk; and
   means, after the pre-appending of the transformed chunk, for copying the last rows of the pre-appended transformed chunk to the top of the transformed chunk, thereby forming the augmented OFDM chunk.

17. The radio node according to claim 15, further comprising:
   means for selecting one column of the augmented chunk during each OFDM symbol transmission, wherein at a first instant the first column of the augmented chunk is selected and at second time instant the second column of the augmented chunk is selected;
   means for up-converting the signals from the baseband into the RF-band;
   means for repeating the selecting, up-converting, and transmitting until all columns of the augmented chunk are transmitted.

18. A method of performing communication in a communication system utilizing relaying and Orthogonal Frequency Domain Multiplexing (OFDM), wherein a transmitting radio node, at least one receiving radio node and at least one relay radio node are engaged in a communication session, and signals are transmitted in the form of OFDM chunks comprising a plurality of OFDM symbols, the method having a transmission phase wherein a 2-dimensional cyclic prefix is added to a representation of an OFDM chunk, the method comprising:
   defining an OFDM chunk comprising N sub-carriers and spanning a time window corresponding to M OFDM symbols;
   applying a 2-dimensional inverse fast Fourier transform (IFFT) to the OFDM chunk, resulting in a transformed chunk;
   pre-appending to the transformed chunk the last column of the transformed chunk; and
   copying a pre-determined number of the last rows of the pre-appended transformed chunk to the top of the transformed chunk, thereby forming an augmented OFDM chunk.

19. The method according to claim 18, wherein the communication system utilizes cooperative relaying.

20. The method according to claim 18, wherein the communication system utilizes multi-hop relaying.

21. The method according to claim 18, wherein the relaying is regenerative.

22. The method according to claim 18, wherein the number of rows is determined from radio channel characteristics.

23. A transmitter adapted for use in a radio node in a communication system utilizing relaying and Orthogonal Frequency Domain Multiplexing (OFDM), comprising:
   a 2D-IFFT module configured to apply a 2-dimensional inverse fast Fourier transform (IFFT) to an OFDM chunk, the OFDM chunk including N sub-carriers and spanning a time window corresponding to M OFDM symbols, and to output a transformed chunk;
   a cyclic prefix module configured to pre-append to a transformed chunk the last column of the transformed chunk and to copy a pre-determined number of last rows of the pre-appended transformed chunk to the top of the pre-appended transformed chunk, thereby forming an augmented OFDM chunk; and
   an up-converter and an antenna to transmit the augmented OFDM chunk.

24. A radio base station comprising a transmitter according to claim 23.

25. A user equipment comprising a transmitter according to claim 23.

* * * * *